(12) United States Patent
Tinwala et al.

(10) Patent No.: US 11,330,819 B2
(45) Date of Patent: May 17, 2022

(54) SYNERGISTIC DISINFECTANT COMPOSITIONS HAVING ENHANCED ANTIMICROBIAL EFFICACY AND STABILITY, AND METHODS OF USING THE SAME

(71) Applicant: Diversey, Inc., Fort Mill, SC (US)

(72) Inventors: Farida H. Tinwala, Mumbai (IN); Xiaobao Li, Mundelein, IL (US); Decio R. Silva, Jr., Amsterdam (NL); Yogaraj Nabar, Mumbai (IN); Arnoud Ubald Maria Gengler, De Uijk (NL)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 16/762,611

(22) PCT Filed: Dec. 13, 2019

(86) PCT No.: PCT/US2019/066283
§ 371 (c)(1),
(2) Date: May 8, 2020

(87) PCT Pub. No.: WO2020/139586
PCT Pub. Date: Jul. 2, 2020

(65) Prior Publication Data
US 2020/0345005 A1    Nov. 5, 2020

Related U.S. Application Data

(60) Provisional application No. 62/923,650, filed on Oct. 21, 2019, provisional application No. 62/786,176, filed on Dec. 28, 2018.

(51) Int. Cl.
| | | |
|---|---|---|
| *A01N 37/20* | (2006.01) | |
| *A01N 25/34* | (2006.01) | |
| *A01N 31/02* | (2006.01) | |
| *A01N 37/02* | (2006.01) | |
| *A01N 41/04* | (2006.01) | |
| *A01N 59/00* | (2006.01) | |

(52) U.S. Cl.
CPC ............ *A01N 37/20* (2013.01); *A01N 25/34* (2013.01); *A01N 31/02* (2013.01); *A01N 37/02* (2013.01); *A01N 41/04* (2013.01); *A01N 59/00* (2013.01)

(58) Field of Classification Search
CPC ........ A01N 37/20; A01N 37/02; A01N 31/02; A01N 41/04
See application file for complete search history.

(56) References Cited

U.S. PATENT DOCUMENTS

| | | |
|---|---|---|
| 6,008,175 A | 12/1999 | Scialla et al. |
| 6,043,209 A | 3/2000 | Micciche et al. |
| 6,086,856 A | 7/2000 | Saferstein et al. |
| 6,177,395 B1 | 1/2001 | Silvaggi et al. |
| 6,187,738 B1 | 2/2001 | Micciche et al. |
| 6,475,970 B1 | 11/2002 | Del Duca et al. |
| 6,531,437 B1 | 3/2003 | Ryan et al. |
| 6,534,075 B1 | 3/2003 | Hei et al. |
| 6,620,854 B2 | 9/2003 | Schnyder et al. |
| 7,179,779 B1 | 2/2007 | Hauser et al. |
| 7,320,956 B2 | 1/2008 | Johnson et al. |
| 7,435,429 B2 | 10/2008 | Modak et al. |
| 7,569,530 B1 | 8/2009 | Pan et al. |
| 8,435,934 B2 | 5/2013 | Papari et al. |
| 10,045,529 B2 | 8/2018 | Griese et al. |
| 2002/0187908 A1 | 12/2002 | Gagliardi et al. |
| 2008/0221007 A1 | 9/2008 | Libralesso et al. |
| 2010/0028458 A1 | 2/2010 | Bobbert |
| 2010/0196504 A1 | 8/2010 | Schmaus et al. |
| 2018/0027812 A1 | 2/2018 | Bobbert |

(Continued)

FOREIGN PATENT DOCUMENTS

| | | | |
|---|---|---|---|
| AU | 2003267545 B2 | 8/2009 | |
| CN | 100531706 C | 8/2009 | |
| CN | 106857513 A | * 6/2017 | ............. A01N 25/12 |

(Continued)

OTHER PUBLICATIONS

Surface Industry—surfactant—2 pages—Sodium Xylene Sulfonate 40% Liquid (CAS No. 1300-72-7)_Surface Chemical Industry—http://www.surfaceindustry.com/Product/Surfactant/2018/0921/sodium-xylene-sulfonate-4 . . . Jun. 19, 2021 (Year: 2021).*

(Continued)

*Primary Examiner* — Lakshmi S Channavajjala
(74) *Attorney, Agent, or Firm* — Warunee Srisiri-Sisson

(57) ABSTRACT

A synergistic disinfectant composition comprises a C1-8 organic acid, an amino acid based surfactant, an anionic surfactant, and a stabilizing agent. The C1-8 organic acid may include two or more types of the C1-8 organic acids with at least one of the C1-8 organic acids is alpha hydroxyl acid. The disinfectant composition has an antimicrobial activity of log reduction of at least 2 under Biocidal Product Registration (BPR) standard EN13727, EN1276, EN13624 or EN1499, and/or the EPA standard that applies the "*Quantitative Methods for Evaluating the Activity of Microbicides used on Hard, Non-Porous Surface*" issued by the Organisation for Economic Co-operation and Development (OECD). In addition, the disinfectant composition may be stable during storage and retain their antimicrobial activity after at least one month at 40° C. When desired, the synergistic disinfectant composition may further comprise an oxidizing agent.

18 Claims, No Drawings

(56) References Cited

U.S. PATENT DOCUMENTS

2019/0297881 A1   10/2019   Ahmadpour

FOREIGN PATENT DOCUMENTS

| EP | 1242073 B1 | 9/2004 |
| EP | 1001011 B2 | 2/2006 |
| EP | 2348838 B1 | 5/2013 |
| RU | 2221548 C1 | 1/2004 |
| WO | 95-33043 A1 | 12/1995 |

OTHER PUBLICATIONS

International Search Report and Written Opinion of Application No. PCT/US2019/066283 dated Apr. 1, 2020; 8 pages.
Occupational Safety and Health Administration, "OSHA•NIOSH Infosheet: Protecting Workers Who Use Cleaning Chemicals" OSHA 3512—Feb. 2012; 3 pages.
US Environmental Protection Agency, "Pesticide Registration: Determining If a Cleaning Product Is a Pesticide under FIFRA" last updated Aug. 12, 2020; 5 pages.

* cited by examiner under the European standards to chemical disinfectants and antiseptics EN13727, EN1276 or EN1499 or other similar methodologies recognized under the biocidal product regulation (BPR regulation (EN)528 (2010), and/or the United States Environmental Protection Agency (EPA) standard that applies the "*Quantitative Methods for Evaluating the Activity of Microbicides used on Hard, Non-Porous Surface*" issued by the Organisation for Economic Co-operation and Development (OECD). Optionally, the disinfectant composition may further comprise an oxidizing agent. Furthermore, the disinfectant composition has substantially the same antimicrobial activity after at least one month at 40° C. storage.

SYNERGISTIC DISINFECTANT COMPOSITIONS HAVING ENHANCED ANTIMICROBIAL EFFICACY AND STABILITY, AND METHODS OF USING THE SAME

CROSS-REFERENCE TO RELATED APPLICATIONS

This application is a National Phase of PCT International Application No. PCT/US2019/066283, filed on Dec. 13, 2019, which claims priority to U.S. Provisional Application No. 62/786,176, filed on Dec. 28, 2018, and U.S. Provisional Application No. 62/923,650, filed Oct. 21, 2019; the content of these patent applications are incorporated by reference herein.

TECHNICAL FIELD

This disclosure relates to disinfectant compositions useful in institutional and healthcare applications.

BACKGROUND

Conventional antimicrobial compositions typically used in liquid disinfectant often present limitations in reaching antimicrobial efficacies at the permitted levels. In addition, many of the compositions pose formulation stability challenges, especially when the concentrations of active ingredients are increased in order to achieve higher antimicrobial efficacy. This may result in unsatisfactory shelf life of the disinfectant compositions, as well as potential hazards under regular storage and use conditions. Some conventional liquid disinfectants purportedly contain both antimicrobial efficacy and biodegradability by using plant origin raw materials. These products, however, do not meet the expectations for desired product attributes (such as foaming profile) observed in commercial non-green, synthetic compositions. Further, biodegradable and plant origin raw materials often produce negative olfactory aspects (such as unpleasant odor) in conventional disinfectant products, causing unsatisfactory user experience and reducing the actual use of these products.

Therefore, there is a need for liquid disinfectant compositions that have one or more of enhanced antimicrobial efficacy, longer shelf life, improved stability, biodegradability, satisfactory foaming profile, improved olfactory aspects, and safer for consumer use.

SUMMARY

In one aspect, a synergistic disinfectant composition is provided that may comprise about 0.1% to about 25.0% by weight of a C1-8 organic acid, about 0.1% to about 20.0% by weight of an amino acid based surfactant, about 0.1% to about 20.0% by weight of an anionic surfactant, about 0.05% to about 20.0% by weight of a stabilizing agent, all based on total weight of the composition. Optionally, the disinfectant composition may comprise about 0.01% to about 5.0% by weight of an oxidizing agent based on total weight of the composition. In certain embodiments, the C1-8 organic acid comprises two or more types of C1-8 organic acids. In further embodiments, the C1-8 organic acid comprises an alpha hydroxyl acid.

In another aspect, a synergistic disinfectant composition is provided that may comprise a C1-8 organic acid; an amino acid based surfactant; a stabilizing agent; and an anionic surfactant, wherein the disinfectant composition has an antimicrobial activity of log reduction of at least 2 under European standards to chemical disinfectants and antiseptics EN13727, EN1276 or EN1499 or other similar methodologies recognized under the biocidal product regulation (BPR regulation (EN)528 (2010), and/or the United States Environmental Protection Agency (EPA) standard that applies the "*Quantitative Methods for Evaluating the Activity of Microbicides used on Hard, Non-Porous Surface*" issued by the Organisation for Economic Co-operation and Development (OECD). Optionally, the disinfectant composition may further comprise an oxidizing agent. Furthermore, the disinfectant composition has substantially the same antimicrobial activity after at least one month at 40° C. storage.

In yet another aspect, a method of disinfecting a surface is provided. The method may comprise applying a synergistic disinfectant composition as disclosed herein to the surface.

Other aspects of the disclosure will become apparent by consideration of the detailed description.

DETAILED DESCRIPTION

The present disclosure generally relates to a synergistic disinfectant composition, in which the antimicrobial efficacy may be enhanced through the synergy between C1-8 organic acids and amino-acid based surfactants. The disclosed synergistic compositions may include a stabilizing agent to achieve the stability with desired shelf life and to maintain the antimicrobial activity for at least one month after being stored at 40° C. In addition, the antimicrobial efficacy of the disclosed disinfectant composition may further be enhanced through the synergistic effect between the organic acid and the stabilizing agent.

The terms "comprise(s)," "comprising," "include(s)," "including," "having," "has," "contain(s)," "containing," and variants thereof, as used herein, are open-ended transitional phrases, terms, or words that are meant to encompass the items listed thereafter and equivalents thereof as well as additional items. The singular forms "a", "and", and "the" include plural references unless the context clearly dictates otherwise. Where the term "comprising" is used, the present disclosure also contemplates other embodiments "comprising", "consisting of", or "consisting essentially of" elements presented herein, whether explicitly set forth or not.

Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

In general, the amount of a component in a composition as disclosed herein is expressed "by weight" which refers to the percentage of the component's weight in the total weight of the composition. Unless indicated otherwise, all concentrations are expressed as weight percentage concentrations.

The term "effective amount" refers to an amount effective that would achieve a desired effect or result. For example, an effective amount of a disinfectant composition may refer to the amount of such composition to achieve a level of antimicrobial activity, which can be measured with a standardized test known in the art. An effective amount of a disinfectant composition may be determined by known methods and may vary according to factors such as the microbial strains, test media, temperature, and other conditions.

The term "substantially the same antimicrobial activity" means that the antimicrobial activity is within at least 80%, preferably at least 90%, with respect to the reference antimicrobial activity.

The term "substantially free", "free", "substantially no", or "no" refers to a disinfectant composition that does not contain a particular compound, or to which a particular compound has not been added to the disinfectant composition. Should the particular compound be present through contamination, the amount of such particular compound shall be less than 0.5% by weight, preferably less than 0.1% by weight.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The disclosed disinfectant composition may comprise a C1-8 organic acid, an amino acid based surfactant, an anionic surfactant, a stabilizing agent, and optionally an oxidizing agent.

C1-8 Organic Acid

The term "C1-8 organic acid" as used herein refers to a carboxylic acids having 1-8 carbon atoms and one or more carboxy (—COOH) groups. The organic acid may have 0, 1, 2, or 3 carbon-carbon double bonds. The organic acid may have a straight or branched carbon chain, a cyclic carbon ring, or an aromatic carbon ring. The organic acid may be unsubstituted or substituted with one or more substituent groups, each of which independently selected from hydroxy (—OH), amino, cyano, halogen, thiol, oxo (=O), and thioxo (=S). Suitable C1-8 organic acids may include, but are not limited to, formic acid, acetic acid, propionic acid, butyric acid, isobutyric acid, valeric acid, isovaleric acid, caproic acid, heptanoic acid, benzoic acid, salicylic acid, caprylic acid, or any combination thereof. Furthermore, the "C1-8 organic acid" may include at least one alpha hydroxy acid containing 1-8 carbon atoms.

The term "alpha hydroxy acid" as used herein refers to a C1-8 organic acid, as defined herein, having a hydroxy group (—OH) attached to a carbon atom adjacent to a carboxy (—COOH) group in the molecular structure. The alpha hydroxy acid may be natural or synthetic compound. Examples of suitable alpha hydroxy acids include, but are not limited to, lactic acid, formic acid, glycolic acid, citric acid, malic acid, mandelic acid, tartaric acid, or any combination thereof.

The disinfectant compositions disclosed herein may comprise about 0.1% to about 50.0% by weight of a C1-8 organic acid. The compositions may comprise at least 0.1%, at least 0.3%, at least 0.5%, at least 1.0%, at least 2.0%, at least 3.0%, at least 4.0%, at least 5.0%, at least 6.0%, at least 7.0%, at least 8.0%, at least 9.0%, at least 10.0%, at least 12.0%, at least 15.0%, at least 20.0%, at least 30.0%, or at least 40.0% by weight of a C1-8 organic acid; and/or the compositions may comprise less than 50.0%, less than 40.0%, less than 30.0%, less than 25.0%, less than 20.0%, less than 15.0%, less than 12.0%, less than 10.0%, less than 9.0%, less than 8.0%, less than 7.0%, less than 6.0%, less than 5.0%, less than 4.0%, less than 3.0%, less than 2.0%, or less than 1.0% by weight of a C1-8 organic acid. For example, the compositions may comprise about 0.1% to about 50.0%, about 0.1% to about 40.0%, about 0.1% to about 30.0%, about 0.1% to about 25.0%, about 0.1% to about 20.0%, about 0.1% to about 15.0%, about 0.1% to about 10.0%, or about 0.1% to about 5.0% by weight of a C1-8 organic acid. The compositions may comprise about 0.5% to about 50.0%, about 0.5% to about 40.0%, about 0.5% to about 30.0%, about 0.5% to about 25.0%, about 0.5% to about 20.0%, about 0.5% to about 15.0%, about 0.5% to about 10.0%, about 0.5% to about 5.0% by weight of a C1-8 organic acid. The compositions may comprise about 1.0% to about 50.0%, about 1.0% to about 40.0%, about 1.0% to about 30.0%, about 1.0% to about 25.0%, about 1.0% to about 20.0%, about 1.0% to about 15.0%, about 1.0% to about 12.0%, about 1.0% to about 10.0%, about 1.0% to about 8.0%, about 1.0% to about 6.0%, or about 1.0% to about 5.0% by weight of a C1-8 organic acid. In some embodiments, the compositions comprise about 1.0% to about 25.0% by weight of a C1-8 organic acid. In particular embodiments, the compositions comprise about 0.5% to about 15.0% by weight, or about 1.0% to about 12.0% by weight of a C1-8 organic acid.

In some embodiments, the organic acid may comprise an alpha hydroxy acid. The disinfectant compositions may comprise at least 0.05%, at least 0.1%, at least 0.2%, at least 0.5%, at least 1.0%, at least 2.0%, at least 3.0%, at least 4.0%, at least 5.0%, at least 6.0%, at least 7.0%, at least 8.0%, at least 9.0%, at least 10.0%, at least 11.0%, at least 12.0%, at least 13.0%, at least 14.0%, or at least 15.0% by weight of an alpha hydroxy acid; and/or the compositions may comprise less than 20.0%, less than 15.0%, less than 14.0%, less than 13.0%, less than 12.0%, less than 11.0%, less than 10%, less than 9.0%, less than 8.0%, less than 7.0%, less than 6.0%, less than 5.0%, less than 4.0%, less than 3.0%, less than 2.0%, less than 1.0%, or less than 0.5% by weight of an alpha hydroxy acid. For example, the compositions may comprise about 0.05% to about 20.0%, about 0.05% to about 15.0%, about 0.05% to about 14.0%, about 0.05% to about 13.0%, about 0.05% to about 12.0%, about 0.05% to about 11.0%, about 0.05% to about 10.0%, about 0.05% to about 9.0%, about 0.05% to about 8.0%, about 0.05% to about 7.0%, about 0.05% to about 6.0%, about 0.05% to about 5.0%, about 0.05% to about 4.0%, about 0.05% to about 3.0%, about 0.05% to about 2.0%, or about 0.05% to about 1.0% by weight of an alpha hydroxy acid. The compositions may comprise about 0.1% to about 20%, about 0.1% to about 15.0%, about 0.1% to about 14.0%, about 0.1% to about 13.0%, about 0.1% to about 12.0%, about 0.1% to about 11.0%, about 0.1% to about 10.0%, about 0.1% to about 9.0%, about 0.1% to about 8.0%, about 0.1% to about 7.0%, about 0.1% to about 6.0%, about 0.1% to about 5.0%, about 0.1% to about 4.0%, about 0.1% to about 3.0%, about 0.1% to about 2.0%, or about 0.1% to about 1.0% by weight of an alpha hydroxy acid. The compositions may comprise about 0.2% to about 20.0%, about 0.5% to about 20.0%, about 0.5% to about 15.0%, about 0.5% to about 14.0%, about 0.5% to about 13.0%, about 0.5% to about 12.0%, about 0.5% to about 11.0%, about 0.5% to about 10.0%, about 0.5% to about 9.0%, about 0.5% to about 8.0%, about 0.5% to about 7.0%, about 0.5% to about 6.0%, about 0.5% to about 5.0%, about 0.5% to about 4.0%, about 0.5% to about 3.0%, about 0.5% to about 2.0%, or about 0.5% to about 1.0% by weight of an alpha hydroxy acid. In some embodiments, the compositions comprise about 0.05% to about 20.0% by weight, or about 0.05% to about 15.0% by weight of an alpha hydroxy acid. In particular embodiments, the compositions comprise about 0.05% to about 12.0% by weight of an alpha hydroxy acid.

In some embodiments, the disclosed disinfectant composition comprises a single types of C1-8 organic acid. In some embodiments, the disclosed disinfectant composition comprises two or more types of C1-8 organic acids, such as a mixture of lactic acid and formic acid. In some further embodiments, the disclosed disinfectant composition comprises two or more types of C1-8 organic acids wherein at least one of the C1-8 organic acids is alpha hydroxyl acid.

In some embodiments, the C1-8 organic acid comprises or consists of alpha hydroxyl acid. In some embodiments, the C1-8 organic acid is a mixture of at least one alpha hydroxy acid and at least one organic acid that does not contain an alpha hydroxyl group, such as formic acid or acetic acid. For example, the compositions as disclosed herein may comprise about 0.1% to about 25.0% by weight of C1-8 organic acid, which includes about 0.05% to about 15.0% by weight of an alpha hydroxy acid and at least one organic acid that does not contain an alpha hydroxy group.

Amino Acid Based Surfactant

The term "amino acid based surfactant" as used herein refers to a chemical compound derived from a natural or synthetic amino acid molecule and having surfactant properties. The amino acid based surfactants include fatty acid derivatives of amino acids, or salts thereof, in which a fatty acid is attached to the amino acid through condensation of a carboxy group (—COOH) of the fatty acid and an amino group (—NH$_2$) of the amino acid to form an amide bond (—CONH—). Suitable amino acids may include, but are not limited to, glycine, lysine, sarcosine, glutamic acid, aspartic acid, aminomalonic acid, or any combination thereof. Suitable fatty acids may include a C10-24 fatty acid, such as C12-20 or C12-18 fatty acids.

The term "C10-24 fatty acid" as used herein refers to a carboxylic acids having 1-8 carbon atoms. The carboxylic acid may have from 0 to 8 carbon-carbon double bonds. The carboxylic acid may have a straight or branched carbon chain, a cyclic carbon ring, or an aromatic carbon ring. The carboxylic acid may be unsubstituted or substituted with one or more substituent groups, each of which independently selected from hydroxy (—OH), amino, cyano, halogen, thiol, oxo (=O), and thioxo (=S). Examples of suitable C10-24 fatty acids may include, but are not limited to, lauric acid, myristic acid, palmitic acid, stearic acid, behenic acid, myristoleic acid, oleic acid, linoleic acid, eruic acid, docosahexanoic acid, or any combination thereof.

In some embodiments, the amino acid based surfactant may comprise a C10-24 fatty acid derivative of amino acid. In some further embodiments, the amino acid based surfactant may comprise a C10-24 fatty acid derivative of amino acid, wherein the amino acid comprises glycine, sarcosine, glutamic acid, aspartic acid, aminomalonic acid, or combinations thereof.

Suitable amino acid based surfactants may include, but are not limited to, sodium lauroyl sarcosinate, sodium lauroyl glycinate, sodium lauroyl aminomalonate, sodium lauroyl aspartate, sodium N-lauroylglutamate, sodium cocoyl glutamate, or combinations thereof. Commercial examples of amino acid based surfactants include sarcosinates marketed under the tradenames Perlastan® (Schill+Seilacher GmbH), Maprosyl® (Stepan Company, USA), Crodasinic® (Croda, UK), Oramix® (Seppic, France), and acylglutamate products, marketed as Amisoft-® (Ajinomoto Corp., Japan).

The disinfectant compositions may comprise at least 0.1%, at least 0.2%, at least 0.4%, at least 0.6%, at least 0.8%, at least 1.0%, at least 2.0%, at least 2.5%, at least 3.0%, at least 3.5%, at least 4.0%, at least 4.5%, at least 5.0%, at least 6.0%, at least 7.0%, at least 8.0%, at least 9.0%, at least 10.0%, at least 12.0%, at least 15.0%, at least 20.0%, or at least 25.0% by weight of an amino acid based surfactant; and/or the compositions may comprise less than 30.0%, less than 25.0%, less than 20.0%, less than 15.0%, less than 12.0%, less than 10.0%, less than 9.0%, less than 8.0%, less than 7.0%, less than 6.0%, less than 5.0%, less than 4.5%, less than 4.0%, less than 3.5%, less than 3.0%, less than 2.5%, less than 2.0%, less than 1.5%, less than 1.0%, less than 0.8%, less than 0.6%, less than 0.4%, or less than 0.2% by weight of an amino acid based surfactant. For example, the compositions may comprise about 0.1% to about 30.0%, about 0.1% to about 25.0%, about 0.1% to about 20.0%, about 0.1% to about 15.0%, about 0.1% to about 10.0%, about 0.1 to about 8.0%, about 0.1% to about 6.0%, about 0.1% to about 5.0%, about 0.1% to about 4.0%, about 0.1% to about 3.0%, about 0.1% to about 2.0%, or about 0.1% to about 1.0% by weight of an amino acid based surfactant. In some embodiments, the compositions comprise about 0.1% to about 20.0% by weight of an amino acid based surfactant. In particular embodiments, the compositions comprise about 0.2% to about 10.0% by weight, or about 0.2% to about 3.0% by weight of an amino acid based surfactant.

Stabilizing Agent

The term "stabilizing agent" as used herein refers to an agent that may help maintain the physical and chemical properties of the compositions disclosed herein. Suitable stabilizing agent for use in the disclosed disinfectant compositions may include, but are not limited to, C1-6 alcohol, glycerol, polyol, glycol ether, or any combination thereof. Non-limiting examples of the C1-6 alcohols include methanol, ethanol, propanol, isopropanol, 1-butanol, 1-pentanol, 2-pentanol, 1-hexanol, 2-hexanol, or any combination thereof. Non-limiting examples of the polyols include alkane polyols having from 2-6 carbon atoms and from 2-3 hydroxyls in the molecule. Non-limiting examples of the polyhydric alcohols include ethylene glycol, propylene glycol, dipropylene glycol, glycerin, 1,2-butanediol, 1,3-butanediol, 1,4-butanediol, 2,3-butanediol, 1,2-propanediol, 1,5-pentanediol, meso-erythritol, neopentyl glycol, pentaerythritol, or any combination thereof. Examples of the glycol ethers include, but are not limited to, those based on ethylene or propylene glycol such as diethylene glycol ethyl ether, dipropylene glycol methyl ether, diethylene glycol methyl ether, diethylene glycol propyl ether, diethylene glycol butyl ether, ethylene/diethylene glycol 2-ethylhexyl ether, ethylene glycol phenyl ether, dipropylene glycol propyl ether, dipropylene glycol butyl ether, propylene glycol phenyl ether, or any combination thereof.

In some embodiments of the present disclosure, the disinfectant composition is substantially free of aromatic alcohol, e.g., benzyl alcohol.

The compositions may comprise at least 0.05%, at least 0.1%, at least 0.2%, at least 0.5%, at least 1.0%, at least 2.0%, at least 3.0%, at least 4.0%, at least 5.0%, at least 6.0%, at least 7.0%, at least 8.0%, at least 9.0%, at least 10.0%, at least 12.0%, at least 15.0%, at least 20.0%, or at least 25.0% by weight of a stabilizing agent; and/or the compositions may comprise less than 30.0%, less than 25.0%, less than 20.0%, less than 15.0%, less than 12.0%, less than 10.0%, less than 9.0%, less than 8.0%, less than 7.0%, less than 6.0%, less than 5.0%, less than 4.0%, less than 3.0%, less than 2.0%, less than 1.0%, less than 0.5%, less than 0.2%, or less than 0.1% by weight of a stabilizing agent. For example, the composition may comprise about 0.05% to about 30.0%, about 0.05% to about 25.0%, about 0.05% to about 20.0%, about 0.05% to about 15.0%, about 0.05% to about 10.0%, about 0.05% to about 8.0%, about 0.05% to about 6.0%, about 0.05% to about 4.0%, about 0.05% to about 2.0%, or about 0.05% to about 1.0% by weight of a stabilizing agent. In some embodiments, the compositions comprise about 0.1% to about 20.0% by weight of a stabilizing agent. In particular embodiments, the compositions comprise about 1.0% to about 10.0% by weight, or about 1.0% to about 6.0% by weight of a stabilizing agent.

Anionic Surfactant

Suitable anionic surfactants for use in the compositions may include, for example, alkyl sulfates, alkyl ether sulfates, alkyl aryl sulfonates, alpha-olefin sulfonates, alkali metal or ammonium salts of alkyl sulfates, alkali metal or ammonium salts of alkyl ether sulfates, alkyl phosphates, silicone phosphates, alkyl glyceryl sulfonates, alkyl sulfosuccinates, alkyl taurates, acyl taurates, sulfoacetates, alkyl phosphate esters, mono alkyl succinates, monoalkyl maleates, sulfoacetates, acyl isethionates, alkyl carboxylates, phosphate esters, sulfosuccinates (e.g., sodium dioctylsulfosuccinate), or any combination thereof. Non-limiting examples of anionic surfactants may include sodium lauryl sulfate, sodium lauryl ether sulfate, ammonium lauryl sulfosuccinate, ammonium lauryl sulfate, ammonium lauryl ether sulfate, sodium dodecylbenzene sulfonate, triethanolamine dodecylbenzene sulfonate, sodium cocoyl isethionate, sodium lauroyl isethionate, or any combination thereof.

In some embodiments, the disclosed disinfectant composition is substantially free of linear benzyl benzene sulfonate, e.g., such as dodecylbenzenesulfonic acid.

The compositions may comprise at least 0.1%, at least 0.2%, at least 0.4%, at least 0.6%, at least 0.8%, at least 1.0%, at least 2.0%, at least 2.5%, at least 3.0%, at least 3.5%, at least 4.0%, at least 4.5%, at least 5.0%, at least 6.0%, at least 7.0%, at least 8.0%, at least 9.0%, at least 10.0%, at least 12.0%, at least 15.0%, at least 20.0%, or at least 25.0% by weight of an anionic surfactant; and/or the compositions may comprise less than 30.0%, less than 25.0%, less than 20.0%, less than 15.0%, less than 12.0%, less than 10.0%, less than 9.0%, less than 8.0%, less than 7.0%, less than 6.0%, less than 5.0%, less than 4.5%, less than 4.0%, less than 3.5%, less than 3.0%, less than 2.5%, less than 2.0%, less than 1.5%, less than 1.0%, less than 0.8%, less than 0.6%, less than 0.4%, or less than 0.2% by weight of an anionic surfactant. For example, the compositions may comprise about 0.1% to about 30.0%, about 0.1% to about 25.0%, about 0.1% to about 20.0%, about 0.1% to about 15.0%, about 0.1% to about 10.0%, about 0.1 to about 8.0%, about 0.1% to about 6.0%, about 0.1% to about 5.0%, about 0.1% to about 4.0%, about 0.1% to about 3.0%, about 0.1% to about 2.0%, or about 0.1% to about 1.0% by weight of an anionic surfactant. In some embodiments, the compositions comprise about 0.1% to about 20.0% by weight of an anionic surfactant. In particular embodiments, the compositions comprise about 0.2% to about 10.0% by weight, or about 0.2% to about 6.0% by weight of an anionic surfactant.

In some embodiments, the anionic surfactant may comprise an alkyl sulfate, an alkyl ether sulfate, or a combination thereof. Suitable alkyl sulfates include, for example, sodium or ammonium salts of C12-14 alcohol sulfate. Suitable alkyl ether sulfates include, for example, sodium or ammonium salts of C12-14 alcohol ethoxylate sulfate.

The compositions may comprise at least 0.1%, at least 0.2%, at least 0.4%, at least 0.6%, at least 0.8%, at least 1.0%, at least 1.2%, at least 1.4%, at least 1.6%, at least 1.8%, at least 2.0%, at least 2.2%, at least 2.4%, at least 2.6%, at least 2.8%, at least 3.0%, at least 3.5%, at least 4.0%, at least 4.5%, at least 5.0%, at least 6.0%, at least 7.0%, at least 8.0%, at least 9.0%, at least 10.0%, at least 12.0%, or at least 14.0% by weight of an alkyl sulfate anionic surfactant; and/or the compositions may comprise less than 15.0%, less than 14.0%, less than 12.0%, less than 10.0%, less than 9.0%, less than 8.0%, less than 7.0%, less than 6.0%, less than 5.0%, less than 4.5%, less than 4.0%, less than 3.5%, less than 3.0%, less than 2.8%, less than 2.6%, less than 2.4%, less than 2.2%, less than 2.0%, less than 1.8%, less than 1.6%, less than 1.4%, less than 1.2%, less than 1.0%, less than 0.8%, less than 0.6%, less than 0.4%, or less than 0.2% by weight of an alkyl sulfate anionic surfactant. For example, the compositions may comprise about 0.1% to about 15.0%, about 0.1% to about 12.0%, about 0.1% to about 10.0%, about 0.1% to about 9.0%, about 0.1 to about 8.0%, about 0.1% to about 7.0%, about 0.1% to about 6.0%, about 0.1% to about 5.0%, about 0.1% to about 4.0%, about 0.1% to about 3.0%, about 0.1% to about 2.5%, about 0.1% to about 2.0%, about 0.1% to about 1.5%, or about 0.1% to about 1.0% by weight of an alkyl sulfate anionic surfactant. In some embodiments, the compositions comprise about 0.2% to about 10.0% by weight or about 0.2% to about 3.0% by weight of an alkyl sulfate anionic surfactant.

The composition may comprise at least 0.1%, at least 0.2%, at least 0.4%, at least 0.6%, at least 0.8%, at least 1.0%, at least 1.2%, at least 1.4%, at least 1.6%, at least 1.8%, at least 2.0%, at least 2.2%, at least 2.4%, at least 2.6%, at least 2.8%, at least 3.0%, at least 3.5%, at least 4.0%, at least 4.5%, at least 5.0%, at least 6.0%, at least 7.0%, at least 8.0%, at least 9.0%, at least 10.0%, at least 12.0%, or at least 14.0% by weight of an alkyl ether sulfate anionic surfactant; and/or the compositions may comprise less than 15.0%, less than 14.0%, less than 12.0%, less than 10.0%, less than 9.0%, less than 8.0%, less than 7.0%, less than 6.0%, less than 5.0%, less than 4.5%, less than 4.0%, less than 3.5%, less than 3.0%, less than 2.8%, less than 2.6%, less than 2.4%, less than 2.2%, less than 2.0%, less than 1.8%, less than 1.6%, less than 1.4%, less than 1.2%, less than 1.0%, less than 0.8%, less than 0.6%, less than 0.4%, or less than 0.2% by weight of an alkyl ether sulfate anionic surfactant. For example, the compositions may comprise about 0.1% to about 15.0%, about 0.1% to about 12.0%, about 0.1% to about 10.0%, about 0.1% to about 9.0%, about 0.1 to about 8.0%, about 0.1% to about 7.0%, about 0.1% to about 6.0%, about 0.1% to about 5.0%, about 0.1% to about 4.0%, about 0.1% to about 3.0%, about 0.1% to about 2.5%, about 0.1% to about 2.0%, about 0.1% to about 1.5%, or about 0.1% to about 1.0% by weight of an alkyl ether sulfate anionic surfactant. In some embodiments, the compositions comprise about 0.2% to about 10.0% by weight, or about 0.2% to about 3.0% by weight of an alkyl ether sulfate anionic surfactant.

Oxidizing Agent

The compositions disclosed herein may optionally include an oxidizing agent. Suitable oxidizing agents may include, for example, ammonium persulfate, sodium persulfate, potassium persulfate, hydrogen peroxide, tert-butyl hydroperoxide, cumene hydroperoxide, tertamyl hydroperoxide, tert-butylperpivalate, tert-butyl perbenzoate, benzoyl peroxide, peroxyacids (like peracetic acid), ozone, chlorine dioxide, or any combination thereof. In some embodiments, the oxidizing agent may be a peroxide such as hydrogen peroxide.

The compositions may comprise at least 0.01%, at least 0.05%, at least 0.1%, at least 0.2%, at least 0.3%, at least 0.4%, at least 0.5%, at least 1.0%, at least 2.0%, at least 3.0%, or at least 4.0% by weight of an oxidizing agent; and/or the compositions may comprise less than 5.0%, less than 4.0%, less than 3.0%, less than 2.0%, less than 1.5%, less than 1.0%, less than 0.5%, less than 0.4%, less than 0.3%, less than 0.2%, or less than 0.1% by weight of an oxidizing agent. For example, the compositions may comprise 0.01% to about 5.0%, about 0.01% to about 4.0%, about 0.01% to about 3.0%, about 0.01% to about 2.0%, about 0.01% to about 1.5%, about 0.01% to about 1.0%, about 0.01% to about 0.5%, about 0.01% to about 0.4%, about 0.01% to about 0.3%, about 0.01% to about 0.2%, or about 0.01% to about 0.1% by weight of an oxidizing agent. In some embodiments, the compositions comprise about 0.01% to about 1.5% by weight, or about 0.5% to about 1.5% by weight of an oxidizing agent.

In some embodiments, the composition comprises an oxidizing agent and the oxidizing agent is peroxide, which is present at about 0.5% to about 1.5% by weight.

In some embodiments, the composition is substantially free of any oxidizing agent. In some embodiments, the composition includes the oxidizing agent in an amount of less than 0.005%, less than 0.001%, less than 0.0005%, or less than 0.0001% by weight.

In some embodiments, the compositions as disclosed herein have a pH of 5 or less. The compositions may have a pH value of less than 4.5, less than 4.0, less than 3.5, less than 3.0, less than 2.5, less than 2.0, less than 1.5, or even less than 1.0; and/or the compositions may have a pH value of at least 0.1, at least 0.5, at least 1.0, at least 1.5, at least 2.0, at least 2.5, at least 3.0, at least 3.5, at least 4.0, or at least 4.5. In some embodiments, the pH is about 1.0 to about 3.0, including about 1.5 to about 3.0, about 2.0 to about 3.0, about 2.1 to 3.0, about 2.2 to 3.0, about 2.2 to 3.0, about 2.3 to 3.0, about 2.4 to 3.0, or about 2.5 to 3.0. In particular embodiments, the pH is about 2.0 to about 3.0, including about 2.1 to about 2.9, about 2.2 to 2.8, or about 2.3 to 2.8.

The composition as disclosed herein may further include an effective amount of one or more additional ingredients selected from pH adjusting agents, buffering agents, non-ionic surfactants, hydrotropes, corrosion inhibitors, sequestering agents, antimicrobial compounds, dyes, rheology modifiers, preservatives, moisturizing agents, emollients, or any combination thereof. The compositions may comprise about 0.01% to about 5.0%, such as about 0.01% to about 5.0%, about 0.01% to about 4.0%, about 0.01% to about 3.0%, about 0.01% to about 2.0%, about 0.01% to about 1.0%, about 0.01% to about 0.5%, or about 0.01% to about 0.1% by weight each of one or more of the additional ingredients.

Suitable pH adjusting agents include substances demonstrating an alkaline property or substances demonstrating an acidic property. Examples of substances demonstrating an alkaline property include, but are not limited to, alkali metal hydroxides such as sodium hydroxide and potassium hydroxide; carbonates such as sodium carbonate, sodium bicarbonate, and potassium carbonate; silicates such as sodium silicate and potassium silicate; borates such as sodium borate; organic acid salts such as sodium citrate; amines such as monoethanolamine and diethanolamine, and ammonia. Examples of substances that demonstrate an acidic property and used for pH adjustment include, but are not limited to, inorganic acids such as hydrochloric acid and sulfuric acid, or organic acids such as citric acid and acetic acid.

Suitable buffering agents may include, but are not limited to, phosphoric acid, monosodium phosphate, disodium phosphate, trisodium phosphate, citric acid and salts such as sodium citrate, benzoic acid, sodium benzoate, or any combination thereof.

Suitable nonionic surfactant may include, but are not limited to, ethylene oxide adducts of C8 to C22, preferably C8 to C16, more preferably C8 to C12 alcohols; ethylene oxide/propylene oxide adducts of ethylene glycol; alkylene glycols; alkyl polyglucosides; or mixtures thereof. Non-limiting examples of suitable types of non-ionic surfactant include ethoxylates of alkyl polyethylene glycol ethers, polyalkylene glycol (e.g., 100% Breox FCC92), or alcohol alkoxylate EO/PO (e.g., Plurafac LF403). Exemplary alcohol ethoxylates include fatty alcohol ethoxylates, e.g., tridecyl alcohol alkoxylate, ethylene oxide adduct, alkyl phenol ethoxylates, or ethoxy/propoxy block surfactants. In some embodiments, the nonionic surfactant is alcohol ethoxylates, EO/PO block copolymers, alkyl polyglucosides, or any combination thereof.

Suitable hydrotropes may include, but are not limited to, benzene sulfonates, naphthalene sulfonates, alkyl benzene sulfonates, naphthalene sulfonates, alkyl sulfonates, alkyl sulfates, alkyl diphenyloxide disulfonates, or phosphate ester hydrotropes. Exemplary alkyl benzene sulfonates include, for example, isopropylbenzene sulfonates, xylene sulfonates, toluene sulfonates, cumene sulfonates, or mixtures any two or more thereof. Exemplary alkyl sulfonates include hexyl sulfonates, octyl sulfonates, and hexyl/octyl sulfonates, or mixtures of any two or more thereof. In some embodiments, the hydrotrope comprises sodium xylene sulfonate, sodium cumene sulfonate, or combinations thereof.

Suitable corrosion inhibitors may include, but are not limited to, triazoles such as benzotriazole, tolyltriazole, and mercaptobenzothiazole; gluconate salts such as sodium gluconate, potassium gluconate and ammonium gluconate; molybdate salts such as sodium molybdate, or any combination thereof.

Suitable sequestering agents may include, but are not limited to, various known phosphate and non-phosphate builder materials. Non-limiting examples of suitable non-phosphate agents include alkali metal citrates; carbonates; bicarbonates; the salts of nitrilotriacetic acid (NTA), methylglycine diacetic acid (MGDA), or glutaric diacetic acid (GLDA); polycarboxylates such as polymaleates, polyacetates, polyhydroxyacrylates, polyacrylate/polymaleate and polyacrylate/polymethacrylate copolymers; zeolites, layered silica; or mixtures thereof. In some embodiments, the sequestering agent is selected from phosphates, NTA, EDTA, MGDA, GLDA, citrates, carbonates, bicarbonates, polyacrylate/polymaleate, or maleic anhydride/(meth) acrylic acid copolymers, e.g., Sokalan CP5 available from BASF.

The sequestering agent herein may also include antiscalants, such as polyacrylates of molecular weight from 1,000 to 400,000, examples of which are supplied by Rohm & Haas, BASF and Alco Corp., or polymers based on acrylic acid combined with other moieties. These include acrylic acid combined with maleic acid, such as Sokalan CP5 and CP7 supplied by BASF or Acusol 479N supplied by Rohm & Haas with methacrylic acid such as Colloid 226/35 supplied by Rhone-Poulenc; with phosphonate such as Casi 773 supplied by Buckman Laboratories; with maleic acid and vinyl acetate such as polymers supplied by Huls; with acrylamide; with sulfophenol methallyl ether such as Aquatreat AR 540 supplied by Alco; with 2-acrylamido-2-methylpropane sulfonic acid such as Acumer 3100 supplied by Rohm & Haas or such as K-775 supplied by Goodrich; with 2-acrylamido-2-methylpropane sulfonic acid and sodium styrene sulfonate such as K-798 supplied by Goodrich; with methyl methacrylate, sodium methallyl sulfonate and sulfophenol methallyl ether such as Alcosperse 240 supplied by Alco; polymaleates such as Belclene 200 supplied by FMC; polymethacrylates such as Tamol 850 from Rohm & Haas polyaspartates; ethylenediamine disuccinate; or organo polyphosphonic acids and their salts such as the sodium salts of aminotri(methylenephosphonic acid) and ethane-1-hydroxy-1,1-diphosphonic acid. In some embodiments, the sequestering agent may be phosphate, phosphonates, EDTA, MGDA, GLDA, polyacrylates, or any combination thereof.

Suitable antimicrobial compounds may include agents that can kill or otherwise inhibit the growth or proliferation of microbes including, for example, bacteria, viruses or fungi. Examples of antimicrobial compounds include, but are not limited to, quaternary ammonium salts, essential oils, antimicrobial pesticides, antibacterials, antivirals, or antiparasitics known in the art.

The compositions may contain dyes used in disinfectant products to visualize coverage or pH sensitive dyes such as thymolphthalein, bromothyol blue, and phenol phenolphthalein.

Suitable rheology modifiers may include, but are not limited to, water soluble cellulosic polymers such as hydroxyethyl cellulose or hydroxypropyl cellulose.

Preservatives may include, but are not limited to, antimicrobials, biocides, or salts. For example, preservatives may include, but are not limited to, KATHON™ Preservatives (mixtures including methylchloroisothiazolinone and methylisothiazolinone from Dow Chemical, Midland, Mich.); NEOLONE 950™ (methylisothiazolinone from Dow Chemical, Midland, Mich.); DMDM hydantoin (available as GLYDANT™ from Lonza, Allendale, N.J.); iodopropynyl butylcarbamate; formaldehyde; benzoic esters (parabens), such as methylparaben, propylparaben, butylparaben, ethylparaben, isopropylparaben, isobutylparaben, benzylparaben; 2-bromo-2-nitropropane-1,3-diol; benzoic acid; formic acid; or those known to those skilled in the art.

The disclosed disinfectant compositions may include at least one skin conditioner such as an emollient, humectant, occlusive agent, or other moisturizing agent to provide moisturizing, skin softening, skin barrier maintenance, anti-irritation, or other skin health benefits. Some non-limiting examples of emollients include stearoxytrimethylsilane, alkyl benzoate, silicone oils, dimethicone, myristyl myristate, cetyl myristate, glyceryl dioleate, methyl laurate, PPG-9 laurate, octyl palmitate, lanolin, propylene glycol, glycerol, fatty acids, natural oils such as sunflower, almond, mineral, canola, sesame, soybean, wheat germ, corn, peanut and olive, isopropyl myristate, myristyl alcohol, aloe vera, hydrolyzed silk protein, Vitamin E, stearyl alcohol, isopropyl palmitate, sorbitol, amino acid complexes, or polyethylene glycol. Some nonlimiting examples of humectants include hydroxyethyl urea, agarose, arginine PCA, fructose, glucose, glutamic acid, glycerol, honey, lactose, maltose, propylene glycol, polyethylene glycol, sorbitol, or any mixtures thereof. Some non-limiting examples of occlusive agents include petrolatum, shea butter, alkyl dimethicones, avocado oil, balm mint oil, canola oil, cod liver oil, corn oil, methicone, mineral oil, olive oil, phenyl trimethicone, trimyristin, soybean oil, glycol distearate, stearyl stearate, synthetic wax, or mixtures thereof. Some non-limiting examples of other moisturizers include cholesterol, cystine, hyaluronic acid, keratin, lecithin, egg yolk, glycine, PPG-12, panthenol, retinol, vegetable oil, or any mixtures thereof. Some non-limiting examples of anti-irritants include bisabolol or panthenol.

In general, the disinfectant compositions as disclosed herein may be prepared by thoroughly mixing the ingredients at room temperature with a mixer or blender such that a homogeneous mixture is obtained. Commercially available ingredients are typically used without further purification or treatment. For liquid compositions, the ingredients may be dissolved in a solvent or liquid carrier (such as alcohol or water) to form a solution. Individual ingredients may be added during the preparation process in any order.

The disclosed disinfectant compositions may have antimicrobial activities measurable by assay methods known in the art, such as those described in "*Guidance on the Biocidal Products Regulation, Volume II Efficacy—Assessment and Evaluation (Parts B+C)*" (version 3.0, April 2018) and "*Performance Criteria—Overview of (EN) Standards, Test Conditions, and Pass Criteria*" (Appendix 4, BPR Efficacy Working Group Document, March 2017), both available at European Chemical Agency (ECHA), the entire contents of each of which are incorporated herein by reference. In some embodiments, the disclosed compositions have an antimicrobial activity of log reduction of at least 2 under Biocidal Product Registration (BPR) standard EN13727, EN13624, or EN1499. For example, the antimicrobial activity may achieve a log reduction of at least 2.0, at least 2.5, at least 3.0, at least 3.5, at least 4.0, at least 4.5, at least 5.0, at least 5.5, or at least 6.0 under BPR standard EN13727, EN1276, EN13624, or EN1499. This includes an antimicrobial activity of log reduction of about 2.5, about 3.0, about 3.5, about 4.5, about 5.0, about 5.5, or about 6.0. The antimicrobial activity may be in the range of log reduction of about 2.0 to about 6.0, about 2.0 to about 5.0, about 2.0 to about 4.0, about 2.0 to about 3.0, about 3.0 to about 6.0, about 3.0 to about 5.0, about 3.0 to about 4.0, about 4.0 to about 6.0, or about 4.0 to about 5.0. In particular embodiments, the compositions have an antimicrobial activity of log reduction of at least 2.0, at least 3.0, or at least 4.0 under the BPR standard tests. Other suitable measurement standards for antimicrobial activity include those described in the regulatory guidelines of United States Environmental Protection Agency (EPA), such as the EPA standard that applies the "*Quantitative Methods for Evaluating the Activity of Microbicides used on Hard, Non-Porous Surface*" issued by the Organisation for Economic Co-operation and Development (OECD) (hereinafter "the OECD Quantitative Methods for Evaluating the Activity of Microbicides"), or "*Series 810—Product Performance Test Guidelines*", as well as those required by the health agencies in other countries. The disclosed compositions may satisfy the BPR standards, the EPA standard according to the OECD Quantitative Methods for Evaluating the Activity of Microbicides, and/or other standards intended to measure antimicrobial activity at a similar level using a similar testing procedure.

Conventional organic acid based antimicrobial actives that are typically used in liquid disinfectant often present limitations in reaching antimicrobial efficacies at the permitted levels. Advantageously, the present disclosure provides a disinfectant composition, in which the antimicrobial efficacy is enhanced through the synergy between C1-8 organic acids and amino acid based surfactants. As a result, the disclosed disinfectant compositions may achieve a desirable level of antimicrobial activity with a reduced amount of the antimicrobial actives, comparable to the currently available commercialized disinfectant products.

The disclosed disinfectant compositions may provide an enhanced antimicrobial efficacy, at least, through the unexpected synergistic effect between C1-8 organic acid and amino acid based surfactant. See, e.g., EXAMPLES 1-6 and 9. This unexpected synergy between C1-8 organic acid and amino acid based surfactant could be achieved against various microorganisms, such as bacteria, yeasts, fungi, spores, viruses, etc. As non-limiting examples, the disclosed disinfectant compositions may provide a synergistic micro efficacy against the following microorganism: *Staphylococcus aureus, Mycobacterium smegmatis, Candida albicans, Mycobacterium bovis, Trychophyton interdigitale*, and the like. See, e.g., EXAMPLES 1-3 for *S. aureus*; EXAMPLES 4, 5 and 11 for *M. smegmatis*, EXAMPLES 6 and 9 for *C. albicans*, EXAMPLE 10 for *T. interdigitale*. Such an enhanced micro efficacy of the disclosed disinfectant compositions may be achieved even without adding oxidizing agent (such as hydrogen peroxide) in the compositions. See, e.g., EXAMPLES 1, 3, 5, 6, 8 and 9. Upon including an oxidizing agent, such as hydrogen peroxide, into the disclosed disinfected compositions, a further enhanced antimicrobial efficacy could be achieved. As a non-limiting example, EXAMPLE 9 shows that upon including hydrogen peroxide into the disinfectant composition (along with C1-18 organic acid, amino acid based surfactant, and stabilizing agent), the amount of C1-8 organic acid required to achieve the desirable micro efficacy could be reduced.

In some embodiments of the present disclosure, the disinfectant compositions may comprise a C1-8 organic acid, an amino acid surfactant, and a stabilizing agent. In some embodiments, the disclosed disinfectant compositions may comprise a C1-8 organic acid, an amino acid surfactant, a stabilizing agent, and an oxidizing agent (e.g., hydrogen peroxide).

The combination of antimicrobial actives (such as the organic acids used in liquid disinfectant solutions) with surface active ionic species (specifically amino acid based surfactants) generally presents formulation stability challenges at the levels sufficient to achieve an effective formulation. Significantly, the stability challenges also extend to the formulations involving oxidizing agents, such as peroxides and the like used in conventional products. Advantageously, the disclosed disinfectant compositions include a stabilizing agent to achieve the physical stability with desired shelf life, without interfering with the synergistic effect between amino acid based surfactants and C1-8 organic acids. Thus, the disclosed disinfectant compositions may provide both enhanced antimicrobial activity and improved stability with reduced concentration of active ingredients and and/or without the use of oxidizing agents. As non-limiting examples, EXAMPLES 7 and 10 show that the physical stability of the disclosed disinfectant compositions may be significantly improved due to the presence of stabilizing agent in the compositions. Moreover, the disclosed disinfectant compositions may maintain the same antimicrobial activity even after at least one month at 40° C. storage. See EXAMPLE 8.

In some embodiments, the disclosed disinfectant compositions may have substantially the same antimicrobial activity after at least one month at 40° C. storage. In some embodiments, the disclosed disinfectant compositions may have substantially the same antimicrobial activity even after at least 3 months at 40° C. storage.

The disclosed disinfectant compositions may be physically and chemically stable during storage. For example, the composition may be in the form of a liquid solution which maintains its physical appearance as a clear solution without detectable phase separation, precipitation, coloration, or crystallization of the solute during storage. The solution may maintain a constant pH or undergo minimum extent of degradation or chemical change in its ingredients including, for example, a degradation of less than 1.0%, less than 0.5%, less than 0.1%, less than 0.05%, or even 0.01% of its active ingredients. The duration of the storage, for example, may be about one month, about two months, about three months, about six months, about nine months, or even about twelve months.

The disclosed composition may also maintain substantially the same level of chemical and biological activities over the storage time. The property to "maintain" an antimicrobial activity as used herein means a product's ability to retain its antimicrobial activity at a level that is at least 90% of its original activity when the product is freshly prepared. For example, the present compositions may maintain at least 90%, at least 91%, at least 92%, at least 93%, at least 94%, at least 95%, at least 96%, at least 97%, at least 98%, at least 99%, at least 99.5%, or even at least 99.9% of their antimicrobial activities over a time period of at least two weeks, at least one month, at least two months, at least three months, or even at least 6 months. The compositions may maintain about 90%, about 91%, about 92%, about 93%, about 94%, about 95%, about 96%, about 97%, about 98%, about 99%, about 99.5%, or even about 99.9% of the antimicrobial activity over a period of at least one month or at least three months. In some embodiments, the compositions maintain about 90%, about 91%, about 92%, about 93%, about 94%, about 95%, about 96%, about 97%, about 98%, about 99%, about 99.5%, or even about 99.9% of the antimicrobial activity over a period of at least three months.

The present compositions may be stable over a temperature range of about 0° C. to about 50° C. including for example, about 0° C. to about 45° C., about 0° C. to about 40° C., about 0° C. to about 35° C., about 0° C. to about 30° C., about 0° C. to about 25° C. (or room temperature), or about 0° C. to about 20° C. storage. For example, the compositions may maintain their antimicrobial activities at a temperature of about 0° C., about 5° C., about 10° C., about 15° C., about 20° C., about 25° C., about 30° C., about 35° C., about 40° C., about 45° C., or even about 50° C.

storage for a period of at least two weeks, at least one month, at least two months, at least three months, or even at least six months. In some embodiments, the compositions maintain about 90%, about 91%, about 92%, about 93%, about 94%, about 95%, about 96%, about 97%, about 98%, about 99%, about 99.5%, or even about 99.9% of the antimicrobial activity at a temperature range of about 0° C. to about 40° C. storage over a period of at least one month or at least three months. In some embodiments, the compositions maintain about 90%, about 91%, about 92%, about 93%, about 94%, about 95%, about 96%, about 97%, about 98%, about 99%, about 99.5%, or even about 99.9% of the antimicrobial activity at a temperature of about 0° C., about 25° C., or about 40° C. storage over a period of at least one month. In some embodiments, the compositions maintain about 90%, about 91%, about 92%, about 93%, about 94%, about 95%, about 96%, about 97%, about 98%, about 99%, about 99.5%, or even about 99.9% of the antimicrobial activity at a temperature of about 0° C., about 25° C., or about 40° C. storage over a period of at least three months.

The stabilizing agent may contribute to an increase in the antimicrobial activity of the disclosed disinfectant compositions. At least, this may be due to the unexpected synergistic effect between the amino acid based surfactant and the stabilizing agent. See EXAMPLE 11.

In some embodiments, the disclosed disinfectant composition is in the form of a solid, such as a powder or a tablet, or a liquid, such as a solution or a suspension. In some embodiments, the composition is power that may be dissolved by a user with a suitable solvent (such as water) to prepare a liquid disinfectant. In some embodiments, the composition is a ready-to-use solution. In some embodiments, the composition is a liquid concentrate, which may be diluted by a user with a suitable diluent at a concentrate/diluent ratio of, for example, 1:1 to 1:1000 by weight. This includes a concentrate/diluent ratio of about 1:5, about 1:10, about 1:20, about 1:50, about 1:100, about 1:200, or about 1:500 by weight.

It has been known in the art that the concentrated disinfectant composition having an amount of salicylic acid above 0.2% weight, based on total weight of the composition, is rather difficult to achieve. This is due to the poor solubility of salicylic acid at such concentrated amount, thereby generally resulting on a phrase separation of the formulation. Surprisingly, the disinfectant composition of present disclosure could be obtained at high level of salicylic acid (e.g., above 0.2% weight based on total weight of the disinfectant composition), with high stability and excellent antimicrobial efficacy. See EXAMPLE 10.

The disinfectant compositions disclosed herein may be built on plant-origin, biodegradable raw materials and demonstrate desired product attributes such as the foam profile comparable to commercial non-green product, at the same time providing enhanced antimicrobial efficacy. The compositions disclosed herein may have improved olfactory aspects compared to conventional disinfectant products that contain biodegradable and/or plant origin raw materials. For example, the compositions may be odorless or essentially free of any unpleasant odor. In some embodiments, the compositions disclosed herein may not produce any negative or unsatisfactory olfactory aspects and are therefore likely to be used more frequently, providing increased sanitization compliance (e.g., hand washing).

In some embodiments, the disclosed synergistic disinfectant composition comprises:
  a C1-8 organic acid;
  an amino acid based surfactant; and
  a stabilizing agent, wherein the composition has an antimicrobial activity of log reduction of at least 2 under Biocidal Product Registration (BPR, Regulation (EN) 528/2012) standard EN13727, EN1276, EN13624, or EN1499; and/or the EPA standard according to the OECD Quantitative Methods for Evaluating the Activity of Microbicides, and wherein the composition has substantially the same antimicrobial activity after at least one month at 40° C. storage.

In some embodiments, the disinfectant composition may further comprise an oxidizing agent.

In some embodiments, the disinfectant composition may further comprise an anionic surfactant.

In some embodiments, the disclosed synergistic disinfectant composition comprises:
  from about 0.1% to about 25.0% by weight of a C1-8 organic acid;
  from about 0.1% to about 20.0% by weight of an amino acid based surfactant;
  from about 0.1% to about 20.0% by weight of an anionic surfactant; and
  from about 0.05% to about 20.0% by weight of a stabilizing agent,
  all based on total weight of the disinfectant composition.

In some embodiments, the disinfectant composition may further comprise from about 0.01% to about 5.0% by weight of an oxidizing agent based on total weight of the composition.

In some embodiments, the balance of the composition is water.

In some embodiments, the disclosed disinfectant composition is substantially free of linear benzyl benzene sulfonate (e.g., dodecylbenzenesulfonic acid) and/or aromatic alcohol (e.g., benzyl alcohol).

In another aspect, the present disclosure provides a method of disinfecting a surface, the method comprising applying a synergistic disinfectant composition as disclosed herein to the surface. Suitable surfaces that may be disinfected using the present compositions include, but are not limited to metal, ceramic, glass, plastic, stainless steel, or wood surfaces. Metal surfaces may include soft metal surfaces, such as aluminum or alloy surfaces. The surface may be a part of a ware, an instrument, a device, furniture, upholstery, or an operational platform used in household, restaurant, healthcare facilities, or other public areas. Examples of household surfaces including, but are not limited to, dishes, cooking wares, cooking devices or appliances, tables, stairs, floors, tiles, sinks, and toilets.

The disclosed synergistic compositions may also be used to disinfect a body surface of an animal, including human, cat, dog, or other animals. For example, the composition may be used to disinfect the surface of a human's hand, leg, or other body parts. In some embodiments, the compositions may be used to disinfect human hands.

The following non-limiting examples illustrate the compositions of the present disclosure and methods of use thereof.

EXAMPLES

Materials and Methods

Commercially available materials include: alkyl (C12-14) 2EO sulphuric acid Na-salt (Texapon® N 70, BASF; Emal® 228 HP, KAO; Rhodapex® ESB 70 NAT, Solvay), sodium dodecyl sulphate (Galaxy 780, Galaxy surfactants Ltd; Calfoam® SLS-30, Pilot; Rhodapon® LS 92RNB, Solvay), N-lauroyl sarcosinic acid Na-salt (Crodasinic™ LS30-LQ- (RB), Croda; Perlastan® L30, Schill & Seilacher), lactic acid (Lactic Acid 88% FCC, Corbion Purac; Galacid Excel 88, Jungbunzlauer), citric acid (Citric Acid, monohydrate, Hangzhou Ruijiang or Jungbunzlauer), glycolic acid (Clariant, Merck).

General preparation methods. The experimental batches were prepared in lab using the listed ingredients with stepwise addition of each raw material and mixing using a steel blade stirrer at 200 to 300 rpm. The balance water was maintained so that the total composition of the resultant homogeneous mixture was at 100%.

Instruments used and general testing methods. The batches were tested for physical parameters using standard testing methods. Specific gravity was measured under ASTM D1217 using pycnometer. The pH values were measured using ASTM E70-07 (pH meter using glass electrode).

Antimicrobial activities were determined according to the regulatory guidelines of United States Environmental Protection Agency (EPA), according to the OECD Quantitative Methods for Evaluating the Activity of Microbicides.

Furthermore, the antimicrobial activities were determined under the Biocidal Products Regulation (BPR) standard EN13727, EN13624, or EN1499 according to "*Performance Criteria—Overview of (EN) Standards, Test Conditions, and Pass Criteria*" (Appendix 4, BPR Efficacy Working Group Document, March 2017) available at European Chemical Agency (ECHA).

The term "log reduction" is a mathematical term used to show the relative number of live microbials being reduced from a tested area. For example, "a log reduction of 5" or "a 5-log reduction" means lowering the number of microbials by $10^5$; "a 4-log reduction" means lowering the number of microbials by $10^4$; "a 3-log reduction" means lowering the number of microbials by $10^3$; "a 2-log reduction" means lowering the number of microbials by $10^2$; and "a 1-log reduction" means lowering the number of microbials by 10.

Example 1

Table 1 showed the micro efficacy of the tested disinfectant formulations against *S. aureus* based on the EPA standard according to the OECD Quantitative Methods for Evaluating the Activity of Microbicides. The organic acids were a mixture of salicylic acid and lactic acid. The amino acid based surfactant was sodium cocoyl glutamate (hereinafter "sodium glutamate"), and the stabilizing agent was propylene glycol n-butyl ether (hereinafter "PnB").

TABLE 1

| Formulation | #1 | #2 | #3 |
| --- | --- | --- | --- |
| Ingredients | On 100% | On 100% | On 100% |
| Salicylic acid | 0 | 0.08 | 0.08 |
| Lactic acid | 0 | 0.38 | 0.38 |
| Hydrogen peroxide | 1 | 1 | 1 |
| Sodium glutamate | 1 | 0 | 1 |
| PnB | 3 | 3 | 3 |
| Sodium xylene sulfonate | 0.3 | 0.3 | 0.3 |
| Water | Bal. | Bal. | Bal. |
| Micro Efficacy against *S. aureus* (Log Reduction) | 2.02 | 0.54 | 3.66 |

Formulation #1, which contained C1-8 organic acids but not amino acid based surfactant, provided a 2.02-log reduction against *S. aureus*. Formulation #2, which contained amino acid based surfactant but not C1-8 organic acids, provided a 0.54-log reduction. Formulation #3, which contained both C1-8 organic acids and amino acid based surfactant, provided a 3.66-log reduction against *S. aureus*.

If the effect between C1-8 organic acids and sodium glutamate surfactant was merely an additive effect, the expected log reduction of *S. aureus* for Formulation #3 (contained both amino acid based surfactant and organic acids) would be $10^{2.02}+10^{0.54}=10^{2.03}$, which would show an expected log reduction of 2.03.

However, Formulation #3 showed a log reduction of 3.66 against *S. aureus*, which is larger than the additive log reductions from Formulation #1 and Formulation #2. Therefore, there was a synergistic effect between C1-8 organic acids and amino acid based surfactant against *S. aureus*.

Example 2

Table 2 showed the synergistic effect between organic acids (a mixture of salicylic acid and lactic acid) and amino acid based surfactant (sodium glutamate) against *S. aureus* under the EPA standard according to the OECD Quantitative Methods for Evaluating the Activity of Microbicides.

TABLE 2

| Formulation | #4 | #5 | #6 | #7 |
| --- | --- | --- | --- | --- |
| Ingredients | On 100% | On 100% | On 100% | On 100% |
| Salicylic acid | 0.15 | 0 | 0.15 | 0.15 |
| Lactic acid | 0.75 | 0 | 0.75 | 0.75 |
| Hydrogen peroxide | 1 | 1 | 1 | 0 |
| Sodium glutamate | 0 | 1.5 | 1.5 | 1.5 |
| PnB | 3 | 3 | 3 | 3 |
| Sodium xylene sulfonate | 0.3 | 0.3 | 0.3 | 0.3 |
| Water | Bal. | Bal. | Bal. | Bal. |
| Micro Efficacy against *S. aureus* (Log Reduction) | 5.03 | 2.95 | 6.38 | 6.38 |

Formulation #4, which contained C1-8 organic acids but not sodium glutamate, provided a 5.03-log reduction against *S. aureus*. Formulation #5, which contained sodium glutamate but not C1-8 organic acids, provided a 2.95-log reduction against *S. aureus*. Formulation #6, which contained both C1-8 organic acids and sodium glutamate, provided a 6.38-log reduction against *S. aureus*.

If the effect between C1-8 organic acids and sodium glutamate surfactant was merely an additive effect, the expected log reduction of *S. aureus* for Formulation #6 (contained both amino acid based surfactant and organic acids) would be $10^{5.03}+10^{2.95}=10^{5.034}$, which would show an expected log reduction of 5.034.

However, Formulation #6 showed a log reduction of 6.38 against *S. aureus*, which is larger than the additive log reductions from Formulation #4 and Formulation #5. Therefore, there was a synergistic effect between C1-8 organic acids and amino acid based surfactant against *S. aureus*.

Formulation #7 contained the same ingredients as Formulation #6, but without hydrogen peroxide (an oxidizing agent). The micro efficacy *S. aureus* of Formulation #7 was about the same as Formulation #6. Thus, such high efficacy against *S. aureus* was achieved even without the use of hydrogen peroxide in the formulation.

Example 3

Table 3 showed the micro efficacy of the tested disinfectant formulations against *S. aureus* based on the EPA standard according to the OECD Quantitative Methods for Evaluating the Activity of Microbicides.

TABLE 3

| Formulation | A | B | C | D |
|---|---|---|---|---|
| Ingredients | On 100% | On 100% | On 100% | On 100% |
| C1-8 Organic acids | 0 | 2.6 | 2.6 | 2.6 |
| Hydrogen peroxide | 0.5 | 0.5 | 0.5 | 0 |
| Sodium sarcosinate | 1.5 | 0 | 1.5 | 1.5 |
| Ethanol | 5 | 5 | 5 | 5 |
| Sodium xylene sulfonate | 0.3 | 0.3 | 0.3 | 0.3 |
| Water | Bal. | Bal. | Bal. | Bal. |
| Micro Efficacy against *S. aureus* (Log Reduction) | 3.29 | 0.82 | 6.38 | 6.38 |

A very strong synergistic effect between C1-8 organic acids and amino acid based surfactant against *S. aureus* was observed in the disinfectant Formulation C, wherein the organic acids were a mixture of salicylic acid and lactic acid (at 0.4% weight and 2.2% weight, respectively, based on total weight of the formulation), the amino acid based surfactant was a sodium salt of N-lauroyl sarcosinate (hereinafter "Sodium sarcosinate"), and the stabilizing agent was ethanol. Formulation D showed that the high efficacy against *S. aureus* were achieved even without the use of hydrogen peroxide in the formulation.

Example 4

*M. smegmatis* was known as the surrogate strain for *M. tuberculosis*. The micro efficacy of the disinfectant formulation was determined based on the EPA standard according to the OECD Quantitative Methods for Evaluating the Activity of Microbicides. Table 4 demonstrated the synergistic effect between C1-8 organic acids and amino acid based surfactant against *M. smegmatis*, wherein the organic acids were a mixture of salicylic acid and lactic acid (at 0.4% weight and 2.2% weight, respectively, based on total weight of the formulation), and the amino acid based surfactant was sodium sarcosinate.

TABLE 4

| Formulation | E | F | G |
|---|---|---|---|
| Ingredients | On 100% | On 100% | On 100% |
| C1-8 Organic acids | 2.0 | 2.0 | 2.0 |
| Hydrogen peroxide | 0.5 | 0.5 | 0.5 |
| Sodium sarcosinate | 0.45 | 0 | 0.45 |
| PnB | 0 | 3.8 | 3.8 |
| Sodium xylene sulfonate | 0.3 | 0.3 | 0.3 |
| Water | Bal. | Bal. | Bal. |
| Micro Efficacy against *M. smegmatis* (Log Reduction) | 0.57 | 4.51 | 6.07 |

Example 5

Table 5 further demonstrated the synergistic effect between organic acids and amino acid based surfactant against *M. smegmatis* under the EPA standard according to the OECD Quantitative Methods for Evaluating the Activity of Microbicides. The organic acids were a mixture of salicylic acid, lactic acid, and formic acid (at 0.3% weight, 1.9% weight, and 1.0% weight, respectively, based on total weight of the formulation). The amino acid based surfactant was sodium sarcosinate, and the stabilizing agent was PnB.

Formulation K showed that the high efficacy against *M. smegmatis* were achieved even without the use of hydrogen peroxide in the formulation.

TABLE 5

| Formulation | H | I | J | K |
|---|---|---|---|---|
| Ingredients | On 100% | On 100% | On 100% | On 100% |
| C1-8 Organic acids | 0 | 3.2 | 3.2 | 3.2 |
| Hydrogen peroxide | 1.0 | 1.0 | 1.0 | 0 |
| Sodium sarcosinate | 1.5 | 0 | 1.5 | 1.5 |
| PnB | 3.8 | 3.8 | 3.8 | 3.8 |
| Sodium xylene sulfonate | 0.3 | 0.3 | 0.3 | 0.3 |
| Water | Bal. | Bal. | Bal. | Bal. |
| Micro Efficacy against *M. smegmatis* (Log Reduction) | 0.38 | 4.13 | 6.13 | 6.13 |

Example 6

Table 6 demonstrated a synergistic effect between C1-8 organic acids and amino acid based surfactant against *Candida Albicans* under the standard test EN13624, wherein the organic acids were a mixture of lactic acid and formic acid, the amino acid based surfactant was sodium sarcosinate, and the stabilizing agent was ethanol.

TABLE 6

| Formulation | L | M | N | O | P |
|---|---|---|---|---|---|
| Ingredients | On 100% | On 100% | On 100% | On 100% | On 100% |
| Organic Acids on 100% active | 5.1 | 0 | 0.5 | 5.4 | 8.1 |
| Sodium sarcosinate, 30% | 0 | 9 | 9 | 9 | 9 |
| Ethanol, 95% | 5.2 | 5.2 | 5.2 | 5.2 | 5.2 |
| Glycerine, 87% | 1 | 1 | 1 | 1 | 1 |
| SLES 2EO, 28%[1] | 9 | 9 | 9 | 9 | 9 |
| SLS, 30% | 9 | 9 | 9 | 9 | 9 |
| Water | Bal. | Bal. | Bal. | Bal. | Bal. |
| Micro Efficiency against *Candida Albicans* (Log reduction) | <1 | <1 | 1.38 | 2.00 | 4.18 |

[1]SLES 2EO is Sodium lauryl ether sulfate, 2EO
[2] SLS is Sodium laureth sulfate

Example 7

Table 7 showed an improved stability of the disinfectant formulations upon including ethanol as a stabilizing agent in the formulations, wherein the disinfectant formulations comprised a mixture of lactic acid and formic acid as the C1-8 organic acids, and sodium sarcosinate as the amino acid based surfactant. Formulation Q, which did not include any ethanol stabilizing agent, was an unstable cloudy solution that resulted in a phase separation. Upon including ethanol stabilizing agent in the formulations (Formulations R and S), the stable clear solutions were achieved.

TABLE 7

| Formulation | Q | R | S |
|---|---|---|---|
| Ingredients | On 100% | On 100% | On 100% |
| SLES 2EO/3EO | 1.0 | 1.0 | 1.5 |
| SLS | 1.0 | 1.0 | 1.5 |
| Sodium sarcosinate | 3.5 | 3.5 | 4.0 |
| Glycerine | 0.9 | 0.9 | 0.9 |
| Lactic acid | 8.0 | 8.0 | 7.0 |
| Formic acid | 1.0 | 1.0 | 0.0 |
| Ethanol | 0 | 0.5 | 0.5 |
| Water | Bal. | Bal. | Bal. |
| Appearance | Cloudy solution | Clear solution | Clear solution |
| Stability | Phase separation | Stable | Stable |

Example 8

Disinfectant Formulation T comprised a mixture of lactic acid and formic acid as the C1-8 organic acids, sodium sarcosinate as the amino acid based surfactant, and ethanol as the stabilizing agent.

| Formulation T | | | |
|---|---|---|---|
| | | Amount | |
| Ingredient | % Active | Weight (g) | % Weight |
| Water | 100% | 61.0 | 61.00 |
| SLES 2EO/3EO | 28% | 9.0 | 2.52 |
| SLS | 30% | 9.0 | 2.70 |
| Sodium Sarcosinate | 30% | 9.0 | 2.70 |
| Glycerine | 87% | 1.0 | 0.87 |
| Lactic acid | 88% | 4.7 | 4.14 |
| Formic acid | 85% | 1.10 | 0.94 |
| Ethanol | 95% | 5.2 | 4.94 |
| | | 100.0 | 100.00% |

Table 8 showed the physical stability and antimicrobial stability data for Formulation T at 40° C. storage. Formulation T was physical stable and maintained its antimicrobial activity for at least three months during storage.

TABLE 8

| Stability period (at 40° C. storage) | Appearance | pH (range 2.3 to 2.8) | Micro Efficacy Against *Candida albicans* (EN13624, log reduction) |
|---|---|---|---|
| 0 day | Clear, stable liquid | 2.70 | >4 |
| 1 month | Clear, stable liquid | 2.70 | >4 |
| 3 month | Clear, stable liquid | 2.78 | >4 |

Example 9

Table 9 showed the micro efficacy of the tested disinfectant formulations against *Candida albicans* under the standard test EN13624.

TABLE 9

| Formulation | V | W | X | Y | Z |
|---|---|---|---|---|---|
| Ingredients | On 100% | On 100% | On 100% | On 100% | On 100% |
| Alkyl ether sulfate salts | 0.95-1.05 | 2.5-3.0 | 2.5-3.0 | 0.95-1.05 | 2.0-2.5 |
| Alkyl sulfate salt | 0.9-1.0 | 2.5-3.0 | 2.5-3.0 | 1.5-2.0 | 2.5 |
| Alpha olefin sulphonates | 1.1-1.2 | 0.9-1.0 | 0.9-1.0 | 0.9-1.0 | 0 |
| Amino acid based surfactant | 0 | 0 | 1.5-2.5 | 1.5-2.5 | 2.4 |
| C1-8 Organic acids (including alpha hydroxy acid) | 9.5-10.5 | 9.5-10.5 | 0 | 10-11 | ~4 |
| Alcohols, glycols, glycerols, glycol ethers | ~5 | ~5 | ~5 | ~5 | ~5 |
| Hydrogen peroxide | 0 | 0 | 0 | 0 | 00.5-1.5 |
| Demineralized Water | Bal. | Bal. | Bal. | Bal. | 0 |
| Micro Efficacy against *Candida albicans* (Log Reduction) | <2 | <2 | <2 | >4 | >4 |

Formulation V, which comprised C1-8 organic acids as the antimicrobial active but without amino acid based surfactant, provided a log reduction of less than 2 against *Candida albicans*. No significant improvement in the antimicrobial activity was observed even when the amount of anionic surfactant was increased (Formulation W). Formulation X, which comprised amino acid based surfactant but without C1-8 organic acids, provided a log reduction of less than 2. Formulation Y, which comprised both C1-18 organic acid and amino acid based surfactant, provided the desired antimicrobial efficacy (>log 4 reduction against *Candida albicans* passing EN13624). These results demonstrated the synergy between the amino acid based surfactant and the C1-8 organic acid in achieving an effective level of antimicrobial activity against *Candida albicans*.

Furthermore, Formulation Z demonstrated that upon including hydrogen peroxide (along with C1-18 organic acids, amino acid based surfactant, and stabilizing agent), the amount of C1-18 organic acids required to achieve the desired antimicrobial efficacy could be significantly reduced.

Example 10

Table 10 below showed that the disinfectant compositions of Formulation DD was obtained at high level of salicylic acid (e.g., above 2% weight based on total weight of the formulation), with high stability and excellent antimicrobial efficacy. The micro efficacy of the disinfectant formulation was determined based on the EPA standard according to the OECD Quantitative Methods for Evaluating the Activity of Microbicides.

TABLE 10

| Formulation | AA | BB | CC | DD |
|---|---|---|---|---|
| Ingredients | On 100% | On 100% | On 100% | On 100% |
| Salicylic acid | 0.8 | 0.8 | 1.6 | 2.4 |
| Hydrogen peroxide | 4.25 | 4.25 | 4.25 | 4.25 |
| Phosphoric acid | 3.4 | 3.4 | 3.4 | 3.4 |
| Sodium sarcosinate | 0 | 6.7 | 6.7 | 6.7 |
| Alcohol (C6-C12) ethoxylate (3.5 EO) | 5 | 5 | 0 | 0 |
| Alkyl diphenyloxide disulphonic acid Na salt | 0 | 0 | 3.8 | 3.8 |
| Ethanol | 0 | 0 | 20 | 20 |
| Water | Bal. | Bal. | Bal. | Bal. |
| Physical Stability | Clear | phase separation | Clear | Clear |
| Dilution | 1:16 | 1:16 | 1:16 | 1:16 |
| Fungicidal Efficacy against *T. interdigitale* (Log reduction) | 4.32 | N/A | 5.60 | 5.60 |

Example 11

Table 11 demonstrated the synergistic effect between stabilizing agent and amino acid based surfactant against *S. aureus*. The amino acid based surfactant was sodium sarcosinate, and the stabilizing agent was PnB. The micro efficacy of the disinfectant formulation was determined based on the EPA standard according to the OECD Quantitative Methods for Evaluating the Activity of Microbicides.

TABLE 11

| Formulation | EE | FF | GG |
|---|---|---|---|
| Ingredients | On 100% | On 100% | On 100% |
| Organic acids | 0 | 0 | 0 |
| Hydrogen peroxide | 0.5 | 0.5 | 0.5 |
| Sodium sarcosinate | 1.5 | 0 | 1.5 |
| PnB | 0 | 3.8 | 3.8 |
| Sodium xylene sulfonate | 0.3 | 0.3 | 0.3 |
| Water | Bal. | Bal. | Bal. |
| Micro Efficacy against *S. aureus* (Log Reduction) | 0.23 | 0.16 | 0.68 |

Various features and advantages of the invention are set forth in the following claims.

We claim:

1. A method of disinfecting a surface, comprising:
    applying a synergistic disinfectant composition to a surface selected from metal, ceramic, glass, hard plastic, stainless steel, wood or any combinations thereof; or to a surface selected from woven fabric, non-woven fabric, filter media, hospital or surgical linen, hospital or surgical garment, soft-surface medical instrument, soft-surface surgical instrument, soft-surface packaging, paper, fiber, soft plastics, elastomer, food, or any combinations thereof,
    wherein the synergistic disinfectant composition comprises:
    amino acid based surfactant chosen from sodium sarcosinate of C10-24 fatty acid, sodium glutamate of C10-24 fatty acid, or a combination thereof, in an amount of from 0.45% to about 20.0% by weight;
    at least one C1-8 organic acid in a synergistic amount to the amino acid based surfactant, wherein the synergistic amount of the C1-8 organic acid is from 0.3% to about 25.0% by weight;
    oxidizing agent in an amount of at least 0.1% but less than 5.0% by weight; and
    anionic surfactant in an amount of from about 0.1% to about 20.0% by weight, all based on total weight of the disinfectant composition,
    wherein the method provides a synergistic antimicrobial effect between the amino acid based surfactant and the C1-8 organic acid.

2. The method of claim 1, wherein the method fulfills at least one of the following:
    (a) the method provides an antimicrobial activity of log reduction of at least 2 under EPA standard applying the "*Quantitative Methods for Evaluating the Activity of Microbicides used on Hard, Non-Porous Surface*" issued by OECD;
    (b) the method provides an antimicrobial activity of log reduction of at least 2 under Biocidal Product Registration (BPR) standard EN13727, EN1276, EN13624, or EN1499.

3. The method of claim 1, wherein the synergistic disinfectant composition has substantially the same antimicrobial activity after at least one month at 40° C. storage.

4. The method of claim 1, wherein the sodium sarcosinate of C10-24 fatty acid comprises a sodium sarcosinate salt of C8-18 fatty acid.

5. The method of claim 1, wherein the synergistic disinfectant composition fulfills at least one of the following:
    (a) the sodium sarcosinate of C10-24 fatty acid comprises sodium lauroyl sarcosinate, (b) the amino acid based surfactant is present in an amount of 0.45% to about 3.0% by weight based on total weight of the disinfectant composition.

6. The method of claim 1, wherein the synergistic disinfectant composition fulfills at least one of the following:
(a) the disinfectant composition comprises two or more types of the C1-8 organic acids,
(b) the disinfectant composition comprises from about 0.5% to about 15.0% by weight of the C1-8 organic acid based on total weight of the composition.

7. The method of claim 1, wherein the C1-8 organic acid comprises formic acid, acetic acid, propionic acid, butyric acid, isobutyric acid, valeric acid, isovaleric acid, caproic acid, heptanoic acid, benzoic acid, salicylic acid, caprylic acid, lactic acid, glycolic acid, citric acid, or any combination thereof.

8. The method of claim 1, wherein the anionic surfactant comprises an alkyl sulfate, an alkyl ether sulfate, an alkyl aryl sulfonate, an alpha-olefin sulfonate, an alkali metal or ammonium salt of alkyl sulfate, an alkali metal or ammonium salt of alkyl ether sulfate, an alkyl phosphate, a silicone phosphate, an alkyl glyceryl sulfonate, an alkyl sulfosuccinate, an alkyl taurate, an acyl taurate, a sulfoacetate, an alkyl phosphate ester, a mono alkyl succinate, a monoalkyl maleate, a sulfoacetate, an acyl isethionate, an alkyl carboxylate, a phosphate ester, a sulfosuccinates, or any combination thereof.

9. The method of claim 1, wherein the synergistic disinfectant composition comprises from about 0.2% to about 10.0% by weight of the anionic surfactant based on total weight of the composition.

10. The method of claim 1, wherein the synergistic disinfectant composition further comprises a stabilizing agent chosen from C1-6 alcohol, glycerol, polyol, glycol ether, or any combination thereof.

11. The method of claim 10, wherein the synergistic disinfectant composition comprises from about 1.0% to about 6.0% by weight of the stabilizing agent based on total weight of the composition.

12. The method of claim 1, wherein the oxidizing agent fulfills at least one of the following:
(a) the oxidizing agent comprises hydrogen peroxide,
(b) the oxidizing agent is present in an amount of from about 0.5% to about 1.5% by weight based on total weight of the disinfectant composition.

13. The method of claim 1, wherein the disinfectant composition fulfills at least one of the following:
(a) the disinfectant composition has a pH of 5 or less,
(b) the disinfectant composition further comprises a pH adjusting agent, a buffering agent, a nonionic surfactant, a hydrotrope, a corrosion inhibitor, a sequestering agent, an antimicrobial compound, a dye, a rheology modifier, a preservative, or any combination thereof.

14. The method of claim 1, wherein the synergistic disinfectant composition comprises, all based on total weight of the disinfectant composition:
the amino acid based surfactant chosen from sodium sarcosinate of C10-24 fatty acid, sodium glutamate of C10-24 fatty acid, or a combination thereof, in an amount of from 0.45% to about 20.0% by weight;
the C1-8 organic acid in a synergistic amount to the amino acid based surfactant, wherein the synergistic amount of the C1-8 organic acid is from about 0.5% to about 25.0% by weight;
the oxidizing agent in an amount of at least 0.1% but less than 5.0% by weight;
the anionic surfactant in an amount of from about 0.1% to about 20.0% by weight;
optionally, stabilizing agent chosen from C1-6 alcohol, glycerol, polyol, glycol ether or any combination thereof, in an amount of from about 0.05% to about 30.0% by weight; and
optionally, at least one of a pH adjusting agent, a buffering agent, a nonionic surfactant, a hydrotrope, a corrosion inhibitor, a sequestering agent, an antimicrobial compound, a dye, a rheology modifier, a preservative, or any combination thereof.

15. The method of claim 1, wherein the method provides a synergistic antimicrobial activity against bacteria, yeast, fungi, spore, virus, or any combination thereof.

16. The method of claim 1, wherein the method provides a synergistic antimicrobial activity against *Staphylococcus aureus, Mycobacterium smegmatis, Candida albicans, Mycobacterium bovis, Trychophyton interdigitale, M. tuberculosis*, or any combination thereof.

17. The method of claim 1, wherein the method further comprises diluting the synergistic disinfectant composition before applying to the surface.

18. The method of claim 1, wherein the method further comprises embedding the synergistic disinfectant composition in a textile medium to provide a disinfectant wipe, before applying the synergistic disinfectant composition to the surface.

* * * * *